United States Patent Office 3,574,128
Patented Apr. 6, 1971

3,574,128
METHODS OF MAKING FILTERS AND PRODUCTS MADE THEREFROM
Frank T. King, Perrysburg, Ohio, assignor to Owens-Illinois, Inc.
No Drawing. Continuation-in-part of application Ser. No. 495,863, Oct. 11, 1965, now Patent No. 3,352,430, which is a continuation-in-part of application Ser. No. 456,525, May 17, 1965. This application Aug. 30, 1967, Ser. No. 664,314
The portion of the term of the patent subsequent to Oct. 21, 1986, has been disclaimed
Int. Cl. G02b 3/20
U.S. Cl. 252—300                                      14 Claims

ABSTRACT OF THE DISCLOSURE

A band-pass filter for transmitting a preselected band of ultraviolet light in the wavelength range of about 1900 to 4000 A. units is prepared by incorporating an ultraviolet light absorbing compound in a transparent, machinable solid organopolysiloxane prepared in a particular way. The ultraviolet light absorbing compound provides (in combination with the resin) a spectrum with at least two intense absorption bands with a pronounced minima between the absorption maxima. The organopolysiloxane is prepared by heating a silane represented by the formula $TSiZ_3$ in which T is an alkyl group such as methyl or an alkenyl group such as vinyl or an aryl group such as phenyl and Z is an alkoxy group such as ethoxy, with water, concentrating the resultant reaction mixture by heating it at a temperature of about 100° to 300° C. to remove by-product alkanol and water, precuring the concentrated product by heating at a temperature of about 90° to 185° C. to provide a further curable organopolysiloxane. The ultraviolet light absorbing compound generally is mixed with the further curable organopolysiloxane which is then formed into an article adapted for use as a filter in said preselected wavelength.

---

This application is a continuation-in-part of copending application Serial No. 495,863 filed Oct. 11, 1965, now Pat. No. 3,352,430 which is a continuation-in-part of application Ser. No. 456,525 filed May 17, 1965, now abandoned.

This invention relates to organopolysiloxane compositions. The invention is also concerned with a process for the manufacture of said organopolysiloxane compositions, filters which are formed from these compositions and a process for filtering ultraviolet light.

Organopolysiloxane compounds are generally known. However, the use of specific thermosetting organopolysiloxane compounds as host materials for an ultraviolet absorbing compound is not taught by the prior artisans. Accordingly, the processes for the manufacture of doped organopolysiloxanes are also novel, as are the filters formed from said compositions and the process for filtering ultraviolet light with these filters.

Ultraviolet filters and filtering compositions are commonly utilized in chemical analytical procedures. To date, the only filters which are adapted to allow transmission down to 1900 A. are quartz interference filters and certain aqueous solutions. While both of these filtering systems are somewhat satisfactory, they have several inherent disadvantages.

Quartz is solid material and possesses excellent transmission properties in the ultraviolet range. However, quartz as an inorganic material, has a very high melting point which effectively precludes its use as a host material for organic dopants. That is, when an organic dopant is introduced into molten quartz, the temperature of the quartz is substantially above the decomposition temperature of the organic dopant with the result that the dopant immediately decomposes. Quartz is also a very hard and brittle material. Accordingly, it is extremely difficult to form filters from quartz and once they are formed they are very susceptible to breakage.

The aqueous solutions of various compounds possess a limited degree of utility as ultraviolet absorbing media. However, because these compositions are liquid, they must be contained in some way. The possibility of leakage through breakage is prevalent and odd shaped filters cannot be formed, except in odd shaped containers. These solutions are also disadvantageous in that small changes in the preparatory technique often results in marked changes in the ultraviolet light absorbing characteristics of the solution. Therefore, reproduction of desired results is often difficult or impossible. Likewise, solutions cannot be used in a vacuum, whereas the product of the invention can. While there are other plastics on the market which exhibit some ultraviolet transmission these plastics generally have poor optical qualities and cannot be used to form an ultraviolet filter as they degrade in the presence of ultraviolet radiation longer than 2000 A. In contrast, the organopolysiloxane compounds as used in this invention do not degrade in the presence of ultraviolet radiation. Accordingly, the ultraviolet transmission qualities of filters formed from organopolysiloxane compounds do not vary when exposed to ultraviolet radiation.

In comparison with the above-described compositions of the prior art, the melting point of the subject organopolysiloxane host materials, is between the range of from about 50° C. to about 230° C. With this low melting point, both organic and inorganic dopants can be added to this composition without the decomposition of the dopant. A wide range of inorganic and organic dopants are soluble or easily dispersible in the compositions of this invention. The compositions of this invention are clear solids which can be readily molded or machined into any desired shape. Because of these forming characteristics, any shape or size filter can be formed including odd shaped special application filters. The organopolysiloxane host materials of this invention are also particularly advantageous in that they possess excellent transmission qualities from 1900 A. to 4000 A., they possess excellent heat stability properties, and as plastic type materials are not susceptible to breakage.

Accordingly, the objects of this invention are to produce a composition which has filtering properties in the ultra-violet range and to produce a filter from said composition. More specifically, the object of this invention is to produce an organo-polysiloxane composition which is doped with an ultraviolet light absorbing compound and the formation of a filter therefrom.

ORGANOPOLYSILOXANE HOST MATERIALS

Organopolysiloxane compounds which are adapted for use in the subject invention are produced by the hydrolysis and condensation of at least one compound embraced by Formula I:

(I)  $T_nSiZ_{(4-n)}$ wherein T independently generally represents a member such as alkyl, alkenyl, and aryl. More specifically T is independently a member such as alkyl, e.g. methyl, ethyl and propyl through hexyl (both normal and isomeric forms), cyclopentyl, cyclohexyl, vinyl and the normal and isomeric forms of propenyl through hexenyl and phenyl. Z independently generally represents a hydrolyzable group. More specifically Z is independently a member such as halogen (chloride, bromine, fluorine and iodine), alkoxy (e.g., methoxy through heptoxy), and acyloxy (e.g., acetoxy, propionoxy, butyroxy, pentanoxy, hexanoxy, etc.) and aryloxy, e.g., phenoxy. $n$ represents a positive integer of less than 2 but is preferably one.

In Formula I, as given above for substituent Z alkoxy groups are preferred because their hydrolysis products are less acidic, and therefore control of the rate of siloxane condensation is simpler. Alkoxy groups of less than 5 carbon atoms are especially advantageous (and are preferred), because the rate of hydrolysis can be inconveniently slow when the organic hydrolyzable radical(s) have a higher molecular weight (i.e., more carbon atoms).

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Preferred organosilane monomers adapted for use in this invention consist essentially of a compound represented by Formula II:

(II) 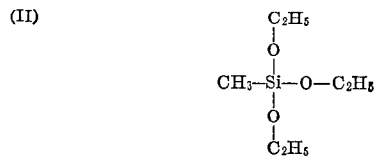

or a mixture of compounds as represented by Formulae III and IV:

(III)      (IV) 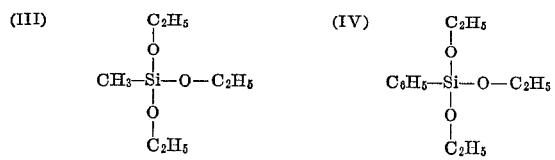

During the in situ hydrolysis and polymerization compounds III and IV link together to form a copolymer. The molar ratio of the compound as represented by Formula III to the compound as represented by Formula IV can be from 1:10 to 10:1 with a more preferred ratio being 1:5 to 5:1. A most preferred composition is produced by the hydrolysis and condensation of 2 moles of the compound as represented by Formula III with one mole of the compound as represented by Formula IV. Up to 10 mole percent but preferably up to 5 mole percent of diphenylsilanediol can be incorporated into the copolymer that is produced by the condensation of compounds as are represented by Formulae III and IV by co-condensation.

In the subject invention at least one monomeric organosiloxane compound as is represented by Formulae I, II, III and IV is converted into solid organopolysiloxane compounds by the following general procedure. The organosiloxane compound or compounds are hydrolyzed at a temperature of from about 50 to about 80° C. for a period of time of from about 1 to about 10 hours, in the presence of water. The temperature is then raised to from about 100 to about 300° C. for a period of time of from about 1 to about 30 minutes to effect the removal of the by-product alcohol and excess water. This also effects the further condensation of the product to produce a heat-curable organopolysiloxane. The heat-curable organopolysiloxane is then partially cured at a temperature of from about 90 to about 185° C. for a period of time of from about ½ to about 24 hours. This partially cured product is then finally cured at a temperature of from about 90 to about 200° C. for a period of time of from about 4 to about 168 hours.

During condensation the above discussed organosiloxane compounds cross-link to form compounds that exhibit exceptional physical properties such as stability and hardness.

The composition and preparation of the monomeric organosiloxane compounds and their subsequent polymerization and copolymerization is fully discussed in copending U.S. patent application Ser. No. 306,344, filed Sept. 3, 1963, now abandoned and U.S. patent application, Ser. No. 370,684, filed May 27, 1964 now abandoned, these applications having an assignee that is common with the assignee of this invention.

The formulation, polymerization and application of the monomeric organosiloxane compounds and organopolysiloxane compounds in this invention is carried out in the presence of a solvent such as methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

To this organopolysiloxane host material is added from about .00001 to about 49 percent by weight as based on the final product, of a dopant compound which has the desired ultraviolet light absorbing characteristics. A more preferred range for the dopant is from about .00001 to about 15 percent, with optimum results from .00001 to 22. While any compound having ultraviolet absorbing characteristics can be utilized as a dopant, compounds having unsaturated bonds are particularly advantageous in the ultraviolet region. Examples of these compounds are 2,4-pentanedione, p-dimethylaminobenzylaldehyde, 2-methylpyrazine, etc.

It is to be noted that the host material of the subject invention can be doped so as to effectively block the transmission of ultraviolet light over all but a narrow band, or conversely dopants can be chosen which will block the transmission of a specific band and allow transmission in all other regions. Likewise, by the proper choice of doping agents, the composition of the invention can be doped to match the ultraviolet spectrum of any desired compound and thereby produce a filter which can be utilized as a standard for said compound.

Suitable ultraviolet light absorbing compounds are anthranilic acid, 2′4′-dihydroxyacetophenone, fluorene, ethyl anthranilate, and 2-amino pyridine. Other compounds having ultraviolet light absorption spectra that can be incorporated into the organopolysiloxane to produce a desirable band-pass filter include 2,2′-dihydroxy diphenyl amine, 1,8-dihydroxy anthraquinone, diacetyl oxime, rubeanic acid, 2-glyceroxy - 1 - methoxy benzene, 2-furyl methyl ketoxime acetate, thioflavnone, 3-amino - 4 - carbethoxy - 6 - chloro-5 cyano 2-methylpyridine, 2-hydroxy propiophenone, salicylic acid ethyl ester, 4-hydroxy acetophenone, 4-hydroxy phenol, benzyl alcohol, cobalt propionate, nickel propionate, trans - 4 - phenyl - 3 - butene-2 - one, 4-hydroxybenzaldehyde, sulfaguanidine, 5-ethoxy salicylic acid ethyl ester, and 2,4,6 - trihydroxy acetophenone.

The above-described ultraviolet light absorption compounds have generally at least two intense ultraviolet absorption bands with a pronounced minima between the absorption maxima. This arrangement of the absorption spectra provides outstanding band-pass filters in the region 1900 to 4000 A. units.

The light absorbing compound must have an ultraviolet chromophore whose light absorption characteristic is that in the ultraviolet region in suitable concentration wavelengths are transmitted in a narrow band while on either side of this pass band wavelengths are strongly absorbed. The position and intensity of the ultraviolet bands depends on the nature of the chromophoric group and can be modified by suitable auxochromic groups over a more restricted range of wavelengths and intensities. Preferred light absorbing compounds having the above-described chromophores are those having double bonded functional groups such as carbonyl, azo, azomethine, and nitroso, or are substituted aromatic compounds, or have a substantially high degree of unsaturation. In addition, the compounds are compatible with the organopolysiloxane and have a desirable transmittance maximum which is necessary in order for the light to travel through the transmitting band of the band-pass filter.

In general, it is preferred that the band-pass filters have half-transmission band widths of about 100 to 300 A., peak transmittances of greater than about 20% for the region 2000 to 3000 A. and greater than about 10% from below about 2000 A., and outside the passband (approximately about 150 to 250 A. and preferably about 200 A. from the half-transmittance point) the transmittance should drop to about $10^{-3}$ of what it is at the half-transmittance point. Preferably beyond the above-described points, the transmission should be only about $10^{-4}$ of that at the half-transmittance point.

INCORPORATION OF THE ULTRAVIOLET LIGHT ABSORBING DOPANT INTO THE ORGANOPOLYSILOXANE

Any suitable technique may be used in incorporation of the ultraviolet light absorbing dopant into the organopolysiloxane. In some instances it may be advantageous to admix the dopant with the silanol(s) and/or precursor(s) of silanol(s) prior to hydrolysis (if a precursor or precursors are employed) and condensation to an organopolysiloxane.

The dopant may be admixed with liquid, semi-solid or solid organopolysiloxanes at any stage of their preparation or after the organopolysiloxane has been formed, the exact point of admixture depending upon such influencing factors, as, for example, the ultimate physical state or form of the organopolysiloxane and the use to which the dopant-modified organopolysiloxane is to be placed. For instance, if the organopolysiloxane is normally a liquid, the dopant may be incorporated into the crude (i.e., impure) organopolysiloxane if the latter is to be modified and employed without further purification prior to use; or the dopant may be admixed with the purified organopolysiloxane fraction of the desired boiling point or boiling range. In the case of the semi-solid organopolysiloxanes such as those in the form of greases, the dopant may be admixed with the organopolysiloxane during or after its conversion to a semi-solid (e.g., grease or grease-like consistency). If the ultimate organopolysiloxane is normally a solid obtained by curing (e.g., heat-curing) a curable (e.g., heat-curable) organopolysiloxane and the end-product is to be used in comminuted or finely divided state (e.g., a fineness of from 100–300-mesh or more, U.S. Standard sieve series), then the dopant may be mixed in a suitable blender with the finely divided organopolysilxonane until a homogeneous (substantially homogeneous) mixture is obtained.

The preferred method of incorporating the ultraviolet light absorbing compound into an organopolysiloxane, more particularly, a curable (e.g., heat-curable) organopolysiloxane, comprises partly curing a curable organopolysiloxane; forming a homogeneous admixture of (a) the partly cured organopolysiloxane in liquid state and (b) a solvent solution of an ultraviolet light absorbing compound; and completing the cure of the partly cured organopolysiloxane in the presence of the said dopant. The preferred organopolysiloxane comprises or consists essentially of the siloxane condensation product of a hydrolyzable silane including at least one compound represented by Formula I. The reference above to the "liquid state" of such organopolysiloxanes means that they may be liquid in the absence of a solvent or that they may be dissolved or dispersed in a solvent to form a liquid composition.

A more preferred specific embodiment of the method features of the present invention is directed to a method of producing an ultraviolet light absorbing composition which comprises:

(A) Hydrolyzing a hydrolyzable silane including at least one compound represented by the general Formula I (I) $\qquad T_nSiZ_{(4-n)}$ wherein each T independently represents a member of the group consisting of alkyl, alkenyl and aryl radicals having less than 7 carbon atoms, each Z independently represents a hydrolyzable group, and $n$ represents a positive integer less than 4, but is preferably 1;

(B) Condensing the hydrolysis product to yield a heat-curable organopolysiloxane;

(C) Adding to the heat-curable organopolysiloxane in liquid state a solvent solution of an ultraviolet light absorbing compound, said ultraviolet light absorbing compound being present in an amount sufficient to impart ultraviolet light absorbing properties to the cured organopolysiloxane composition;

(D) Mixing the resulting liquid mass to form a homogeneous mixture;

(E) Partly curing the heat-curable organopolysiloxane at a temperature of from about 90 to about 135° C. for from about ½ to about 36 hours; and (F) Completing the cure of the partly cured organopolysiloxane in the presence of the ultraviolet light absorbing compound at a temperature of from about 90 to about 135° C. for a period of time of from about ½ to about 36 hours.

Filters formed according to this invention can be produced by molding the doped organopolysiloxane material into the desired shape. Filter blanks can also be formed, these blanks being subsequently machined and polished into the desired shape.

The following examples will illustrate the subject invention. These examples are given for the purposes of illustration and not for the purpose of limiting this invention.

EXAMPLE I

To 50 grams of methyltriethoxysilane prepolymer dissolved in ethanol was added .240 gram of 2,4-pentanedione with stirring. The prepolymer was then partially cured by rapid heating with stirring to 125° C. The composite mixture was then cured in an oven at 90° C. for from 2 to 7 days. Five grams of the finished cured product was formed by grinding and polishing into a filter measuring 2 inches in diameter by .050 inch. When a beam of ultraviolet radiation was passed through this filter, the filter exhibited the ultraviolet absorption characteristics of 2,4-pentanedione. More specifically, the filter exhibited a transmission band at 2250 A. with 38 percent transmission and at 3100 A. to 3600 A. with transmission range from 50 to 70 percent. The filter exhibited complete absorption in a 2600 A. to 2900 A. range.

EXAMPLE II

Using the procedure of Example I, .01 gram of p-dimethylaminobenzylaldehyde was added to 50 grams of methyltriethoxysilane. Upon curing, a filter 2 inches in diameter by .043 inch thick was formed. The filter showed the absorption characteristics of p-dimethylaminobenzylaldehyde. This filter showed ultraviolet transmission between the ranges of 2000 A. and 3100 A. and complete absorption from 3100 A. to 3600 A. The filter exhibited maximum transmission peaks at 2225 A. with 15 percent transmission and at 2600 A. with a 63 percent transmission.

EXAMPLE III

Again utilizing the procedure of Example I, to 50 grams of methyltriethoxysilane was added .060 gram of 2-methylpyrazine. Upon curing a filter 2 inches in diameter and .047 inch thick was formed. This filter showed complete absorption from 2550 A. to 2750 A. Over the range of 2750 A. to 3100 A. the average transmission was 30 percent. From 3100 A. to 3600 A. the transmission gradually increased reaching a maximum of 90 percent at 3600 A. A second transmission peak exists with a maximum of 60 percent at 2250 A.

Other ultraviolet light absorbing compounds as previously described can be substituted in whole or in part for the ultraviolet light absorbing compounds in the Examples I to III to provide substantially equivalent results as to effect but at different wavelengths. Also, mixtures of two or more compounds can be used. As an example of another ultraviolet light absorbing compound, anthranilic acid provides a band-pass filter which transmits 71% at 270 m$\mu$ but which transmits less than 0.01% of the ultraviolet light from the range 315 to 350 and from the range 210 to 250 m$\mu$, the thickness of the filter being 0.648 centimeter. Hence it can be seen that this provides good transmittance in a narrow band but that the edges of the band effectively eliminate the ultraviolet light in the 315–350 and 210–250 m$\mu$ ranges. Likewise, 2',4'-dihydroxy acetophenone can be incorporated into the organopolysiloxane as described in Example I and the resultant band-pass filter transmits less than 0.1% at 270–280 m$\mu$ and 250 m$\mu$. The filter also has a smaller transmission peak at 224 m$\mu$ amounting to 1%, but transmits 59% of the ultraviolet light at the narrow band 245 m$\mu$. In a similar manner it has been found that fluorene transmits less than 0.1% in the band 270 to 250 m$\mu$ and transmits 26% at 231 m$\mu$. Also other compounds, for example, ethyl anthranilate and 2-amino pyridine, provide excellent filters having narrow bands for the transmission of ultraviolet light, each narrow band of the spectrum being disposed between areas in which the light is absorbed.

What is claimed is:
1. A filter comprising a hard, polishable, machinable, transparent organopolysiloxane having incorporated therein an effective light absorbing amount of a compound that transmits a preselected band of ultraviolet wavelength in the range of about 1900 to 4000 A. units, the organopolysiloxane being prepared by
   (1) heating a silane of the formula TSiZ$_3$ in which T is a member of the group consisting of alkyl, alkenyl and aryl having from 1 to 6 carbon atoms, and Z is an alkoxy group containing from 1 to 6 carbon atoms, in the presence of water,
   (2) concentrating the reaction mixture of step 1 by heating the same at a temperature of about 100° to 300° C. to remove by-product alkanol and water,
   (3) precuring the product of step 2 by heating at a temperature of about 90° to 185° C. to provide a further curable, organopolysiloxane, and
   (4) forming the resultant organopolysiloxane into an article adapted for use as a filter in a preselected band of wavelength.
2. A filter as defined in claim 1 in which the amount of ultraviolet light absorbing compound is about 0.00001 to 15 percent by weight of the article.
3. A filter as defined in claim 1 in which the ultraviolet light absorbing compound is a substituted aromatic hydrocarbon in which the ultraviolet light spectrum has a pair of intense ultraviolet light absorption bands with a marked minima between the absorption maxima thereof.
4. A filter as defined in claim 1 in which the ultraviolet light absorbing compound is a compound having a functional group with a double bond in which the ultraviolet light spectrum has two intense ultraviolet light absorption bands with a marked minima between the absorption maxima thereof.
5. A filter as defined in claim 1 in which the ultraviolet light absorbing compound has a carbonyl group in which the ultraviolet light spectrum has two intense ultraviolet light absorption bands with a pronounced minima between the absorption maxima thereof.
6. A filter as defined in claim 1 in which the ultraviolet light absorbing compound has an azo group in which the ultraviolet light spectrum has a pair of intense ultraviolet light absorption bands with a marked minima between the absorption maxima thereof.
7. A filter as defined in claim 1 in which the ultraviolet light absorbing compound has an azomethine group in which the ultraviolet light spectrum has a pair of intense ultraviolet light absorption bands with a pronounced minima between the absorption maxima thereof.
8. A filter as defined in claim 1 in which the ultraviolet light absorbing compound has a nitroso group in which the ultraviolet light spectrum has two intense ultraviolet light absorption bands with a pronounced minima between the absorption maxima thereof.
9. A filter as defined in claim 1 in which the ultraviolet light absorbing compound is an unsaturated compound in which the ultraviolet light spectrum has a pair of intense ultraviolet light absorption bands with a marked minima between the absorption maxima thereof.
10. A filter as defined in claim 1 in which the silane is methyltrialkoxysilane.
11. A filter as defined in claim 1 in which the silane is a mixture of methyltrialkoxysilane and phenyltrialkoxysilane.
12. A filter as defined in claim 1 in which the compound is 2,4-pentanedione.
13. A filter as defined in claim 1 in which the compound is p-dimethylaminobenzylaldehyde.
14. A filter as defined in claim 1 in which the compound is 2-methylpyrazine.

References Cited
UNITED STATES PATENTS

| | | | |
|---|---|---|---|
| 3,043,709 | 7/1962 | Amborski | 252—300 |
| 3,186,963 | 6/1965 | Lewis et al. | 260—46.5 |
| 3,225,018 | 12/1965 | Zutty | 260—88.1 |
| 3,429,732 | 2/1969 | Baitinger | 117—33.3 |
| 3,474,039 | 10/1969 | Newing | 252—300 |

OTHER REFERENCES

Meals-Lewis, Silicones, 1959, pp. 63–66.

GEORGE F. LESMES, Primary Examiner

M. B. WITTENBERG, Assistant Examiner

U.S. Cl. X.R.

96—90; 117—33.3; 260—46.5; 350—1